United States Patent
Kiester et al.

(10) Patent No.: US 9,849,799 B2
(45) Date of Patent: Dec. 26, 2017

(54) ADJUSTABLE DEVICE POSITIONER

(71) Applicant: GM GLOBAL TECHNOLOGY OPERATIONS LLC, Detroit, MI (US)

(72) Inventors: Timothy A. Kiester, Sterling Heights, MI (US); Jason C. Bone, Clarkston, MI (US); Kenton L. West, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 102 days.

(21) Appl. No.: 15/130,394

(22) Filed: Apr. 15, 2016

(65) Prior Publication Data

US 2017/0297444 A1  Oct. 19, 2017

(51) Int. Cl.
| | |
|---|---|
| B60L 11/18 | (2006.01) |
| H04M 1/04 | (2006.01) |
| H04B 1/3883 | (2015.01) |
| H04B 1/3877 | (2015.01) |

(52) U.S. Cl.
CPC ......... *B60L 11/1829* (2013.01); *B60L 11/182* (2013.01); *H04B 1/3877* (2013.01); *H04B 1/3883* (2013.01); *H04M 1/04* (2013.01)

(58) Field of Classification Search
CPC .. B60L 11/1829; B60L 11/182; H04B 1/3883; H04B 1/3877
USPC ........................................................ 320/109
See application file for complete search history.

(56) References Cited

U.S. PATENT DOCUMENTS

| | | | | |
|---|---|---|---|---|
| 5,551,680 A | * | 9/1996 | Ohmichi | B65H 39/11 270/58.08 |
| 6,206,260 B1 | * | 3/2001 | Covell | B60N 3/083 206/5 |
| 7,150,204 B2 | * | 12/2006 | Uphaus | B62D 1/184 280/775 |
| 7,377,223 B2 | * | 5/2008 | Toupin | B63B 19/00 114/343 |
| 7,393,037 B2 | * | 7/2008 | Hwang | B60R 5/04 224/400 |
| 9,225,377 B1 | * | 12/2015 | Hart | H04B 1/3877 |
| 9,714,530 B2 | * | 7/2017 | Amick | E05B 77/54 |
| 9,744,858 B2 | * | 8/2017 | Hall | B60L 1/00 |
| 2011/0084511 A1 | * | 4/2011 | Evans | B60R 7/06 296/37.12 |
| 2014/0265555 A1 | * | 9/2014 | Hall | B60L 1/00 307/9.1 |
| 2016/0004281 A1 | * | 1/2016 | Fischer | G06F 1/1632 710/304 |

* cited by examiner

Primary Examiner — M'Baye Diao
(74) Attorney, Agent, or Firm — Quinn IP Law

(57) ABSTRACT

An adjustable device positioner is configured for storage and access of a variety of devices, each having a back, a first end, a second end, and a length. The device positioner includes a bin, a tray, and an end rest. The tray is disposed inside the bin and has a back rest surface. The tray is positioned such that the back rest surface supports the backs of the devices. The end rest is operatively connected to one of the bin and the tray. The end rest has an end rest surface configured to support the first ends of the devices. The end rest is movable to and lockable in a selected position to accommodate the lengths of the devices such that the second ends of the devices protrude from both the tray and the bin for easy hand access when the devices are stored in the adjustable device positioner.

20 Claims, 4 Drawing Sheets

ADJUSTABLE DEVICE POSITIONER

TECHNICAL FIELD

This disclosure relates to an adjustable device positioner.

BACKGROUND

A vehicle may include a center console that has a pocket for storage of and access to a device, such as a mobile device like a phone or a tablet. The device may be charged when it is placed in the pocket via an inductive charger or a wire connection.

SUMMARY

An adjustable device positioner and a vehicle are disclosed herein. The adjustable device positioner is configured for storage and access of a variety of devices, each having a back, a first end, a second end, and a length. The adjustable device positioner includes a bin, a tray, and an end rest. The tray is disposed inside the bin and has a back rest surface. The tray is positioned such that the back rest surface supports the backs of the devices when the devices are stored in the adjustable device positioner. The end rest is operatively connected to one of the bin and the tray. The end rest has an end rest surface configured to support the first ends of the devices when the devices are stored in the adjustable device positioner. The end rest is movable to and lockable in a selected position to accommodate the lengths of the devices such that the second ends of the devices protrude from both the tray and the bin for easy hand access when the devices are stored in the adjustable device positioner.

The vehicle includes a storage unit having an adjustable device positioner. The adjustable device positioner is configured for storage and access of a variety of devices, each having a back, a first end, a second end, and a length. The adjustable device positioner includes a bin, a tray, and an end rest. The tray is disposed inside the bin and has a back rest surface. The tray is positioned such that the back rest surface supports the backs of the devices when the devices are stored in the adjustable device positioner. The end rest is operatively connected to one of the bin and the tray and has an end rest surface configured to support the first ends of the devices when the devices are stored in the adjustable device positioner. The end rest is movable to and lockable in a selected position to accommodate the lengths of the devices such that the second ends of the devices protrude from both the tray and the bin for easy hand access when the devices are stored in the adjustable device positioner.

The adjustable device positioner and the vehicle disclosed herein accommodate devices having a range of lengths and provide adjustable positioning of the devices to accommodate storage, charging, and/or easy hand access. This disclosure applies to any machine or manufacture, either stationary or mobile, in which a device is stored, charged, and/or accessed. This disclosure applies to any vehicle, including but not limited to cars, trucks, vans, all-terrain vehicles, busses, boats, trains, airplanes, manufacturing vehicles and equipment, construction vehicles and equipment, maintenance vehicles and equipment, military vehicles and equipment, etc.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
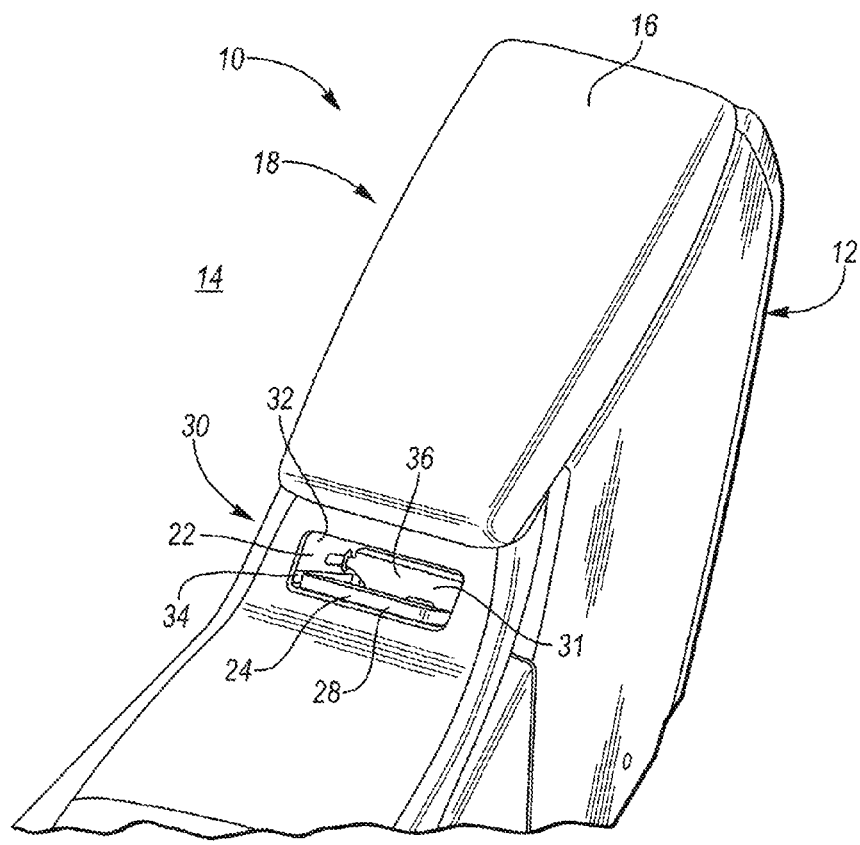
FIG. 1 is a fragmentary, schematic, perspective illustration of a vehicle having a center console including an adjustable device positioner.

Referring to the drawings, wherein like reference numbers refer to like components throughout the views, FIG. 1 shows a portion of an example vehicle 10. The vehicle 10 includes an adjustable device positioner 30 of the type disclosed herein. While the vehicle 10 of FIG. 1 is a typical example application suitable for the adjustable device positioner 30 disclosed herein, the present design is not limited to vehicular applications. Any stationary or mobile, machine or manufacture in which a device is stored, charged, and/or accessed may benefit from use of the present design, when properly scaled and configured for the particular application. For illustrative consistency, the vehicle 10 will be described hereinafter as an example system without limiting use of the adjustable device positioner 30 to such an embodiment.

Figure 2:
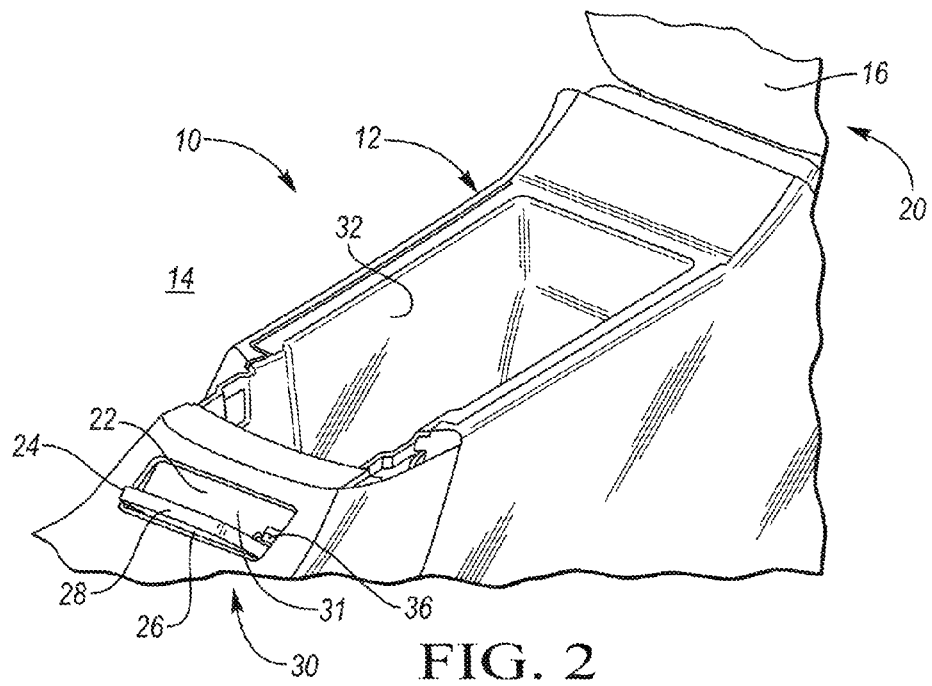
FIG. 2 is a fragmentary, schematic, perspective illustration of the center console of FIG. 1 with an openable cover of the center console in an open position.
Figure 3:
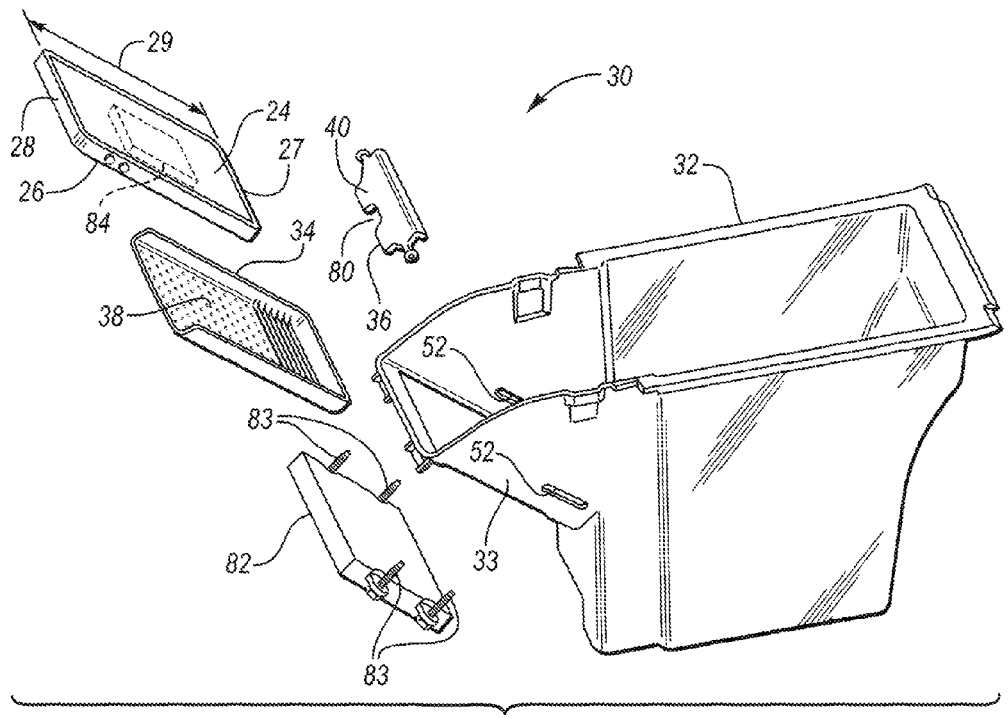
FIG. 3 is schematic, perspective, exploded illustration of the adjustable device positioner of FIG. 1.

Referring now to FIGS. 1-3, the vehicle 10 includes a storage unit 12. The storage unit 12 may be disposed in an interior 14 of the vehicle 10, as shown. The storage unit 12 may be proximate to an operator or occupant (not shown) of the vehicle 10. Alternatively, the storage unit 12 may be located on an exterior (not shown) of the vehicle 10. For example, the storage unit 12 may be located in or on an exterior cargo area (not shown) or in a cargo bed (not shown) of the vehicle 10. The storage unit 12 may be a center console, as shown. Alternatively, the storage unit 12 may be any other type storage device in the interior 14 or on the exterior of the vehicle 10. The storage unit 12 may include a bin 32 configured to store objects, such as maps, tools, papers, etc. The storage unit 12 may have an openable cover 16, shown in a closed position 18 in FIG. 1. The openable cover 16 may be configured to allow access to the bin 32 when the openable cover 16 is in an open position 20, as shown in FIG. 2.

The adjustable device positioner 30 is configured for storage of a device 24 and to provide easy hand access to the device 24. The device 24 may be a mobile device such as a phone, as shown, a tablet, a navigation device, a computer, or any other mobile device or other object that may be desired or used by an occupant or operator of the vehicle 10. The device 24 has a back 26, a first end 27, a second end 28, and a length 29. The device 24 is a selected one of a variety of devices. The variety of devices may have a range of dimensions, including a range of lengths 29. Easy hand access is defined herein as the ability of a hand (not shown) of the occupant or operator of the vehicle 10 to easily grasp the device 24 proximate to the second end 28 of the device 24 to remove the device 24 from the adjustable device positioner 30 without obstruction by the storage unit 12 or the adjustable device positioner 30.

Continuing to refer to FIGS. 1-3, the storage unit 12 may be configured with an opening 22 for the adjustable device positioner 30. The opening 22 of the storage unit 12 and the adjustable device positioner 30 together may form a pocket 31 for storage of, charging of, and easy hand access to the device 24. The pocket 31 may be a complete pocket (not shown) having an opening, four closed sides, and a closed bottom or may be a partial pocket, having an opening, three closed sides, one open side, and a bottom, as shown. The device 24 may protrude from the storage unit 12 through the opening 22 for easy hand access when the device 24 is stored in the adjustable device positioner 30.

The adjustable device positioner 30 includes the bin 32, a tray 34, and an end rest 36. The bin 32 may have an outer surface 33. The tray 34 is connected to and disposed inside the bin 32. The tray 34 may be a diagonal tray, as shown, i.e., the tray 34 may be disposed at an angle between vertical, i.e., normal to a ground plane and horizontal, i.e., parallel to the ground plane. The ground plane is defined herein as the plane of the road or the ground surface that the vehicle 10 travels on. The tray 34 has a back rest surface 38 configured to support the back 26 of the device 24. The tray 34 may be positioned such that the back 26 of the device 24 is held against the back rest surface 38 of the tray 34 via gravity when the device 24 is stored in the adjustable device positioner 30. The tray 34 may be removable from the bin 32 and the storage unit 12 without a tool. The tray 34 may include a rubber mat (not shown). The rubber mat may form the back rest surface 38 of the tray 34.

Figure 4:
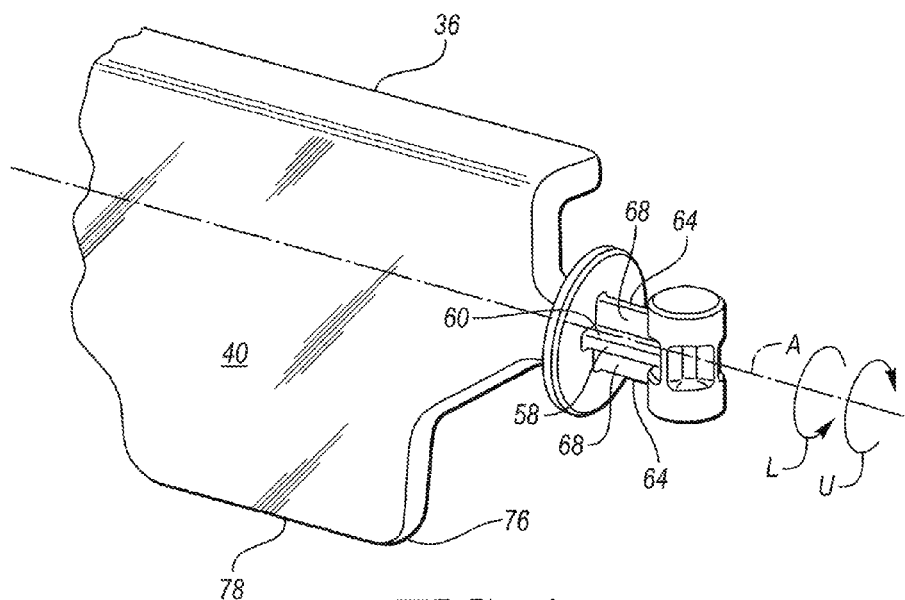
FIG. 4 is a fragmentary, schematic, perspective illustration of an end rest of the adjustable device positioner of FIG. 1.
Figure 5:
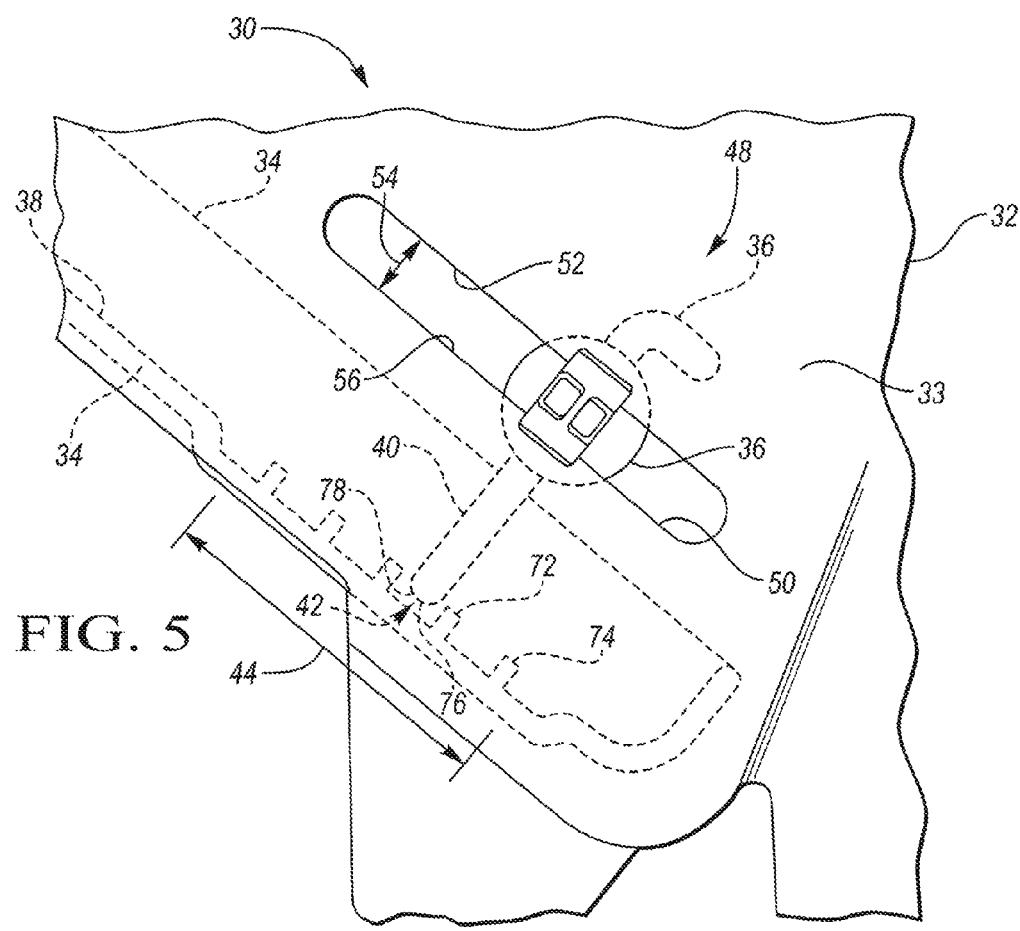
FIG. 5 is a fragmentary, schematic, side view illustration of the adjustable device positioner of FIG. 1 with the end rest locked in a selected position.
Figure 6:
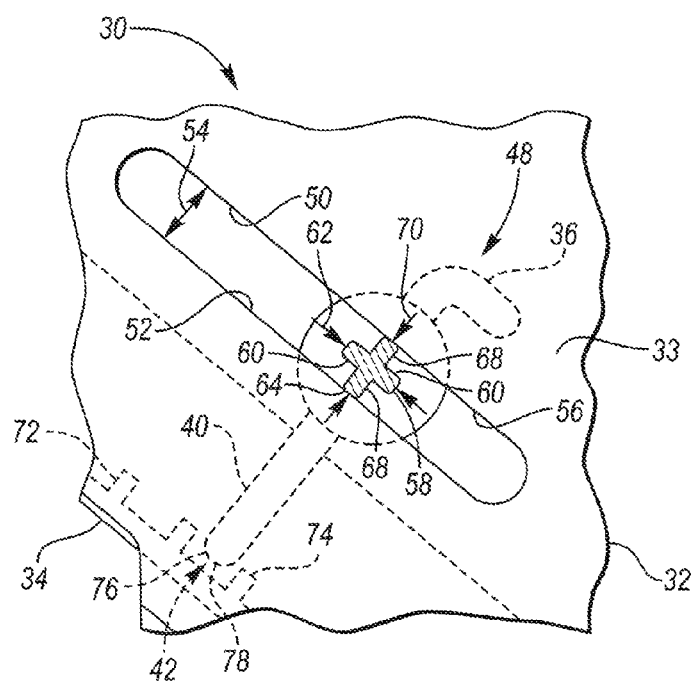
FIG. 6 is a fragmentary, schematic, cross-sectional illustration, partially in elevation, of the adjustable device positioner of FIG. 1, taken at and normal to an outer surface of the bin with the end rest locked in the selected position.

Referring now to FIGS. 4-6, the end rest 36 is operatively connected to one of the bin 32 and the tray 34 and has an end rest surface 40 configured to support the first end 27 of the device 24 when the device 24 is stored in the adjustable device positioner 30. The end rest 36 may be configured such that the first end 27 of the device 24 is held against the end rest surface 40 of the end rest 36 via gravity when the device 24 is stored in the adjustable device positioner 30. The end rest 36 is movable to and lockable in a selected position 42 within a range of selectable positions 44 to accommodate the length 29 of the device 24 such that the second end 28 of the device 24 protrudes from both the tray 34 and the bin 32 for easy hand access when the device 24 is stored in the adjustable device positioner 30. The end rest 36 of the adjustable device positioner 30 may be movable to and lockable in the selected position 42 within the range of selectable positions 44 by an operator or occupant of the vehicle 10 when the openable cover 16 of the storage unit 12 is in the open position 20. The end rest 36 may be movable to and lockable in the selected position 42 within the range of selectable positions 44 without a tool by the operator or occupant of the vehicle 10.

Figure 7A:
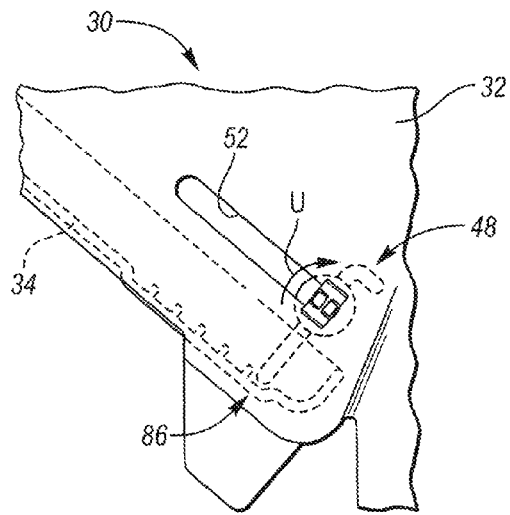
FIG. 7A is a fragmentary, schematic, side view illustration of the adjustable device positioner of FIG. 1 with the end rest locked in a first selected position.
Figure 7B:
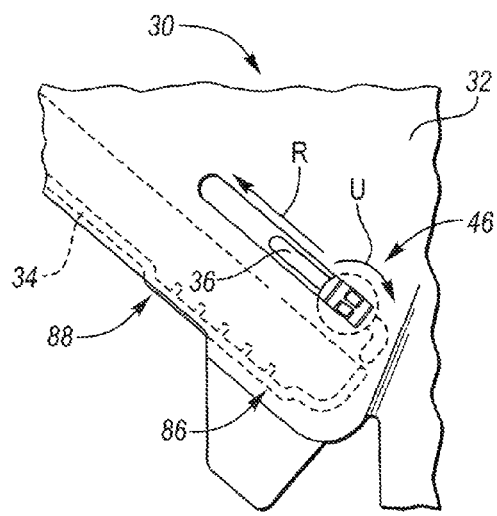
FIG. 7B is a fragmentary, schematic, side view illustration of the adjustable device positioner of FIG. 1 with the end rest unlocked at the first selected position and movable to a second selected position.
Figure 7C:
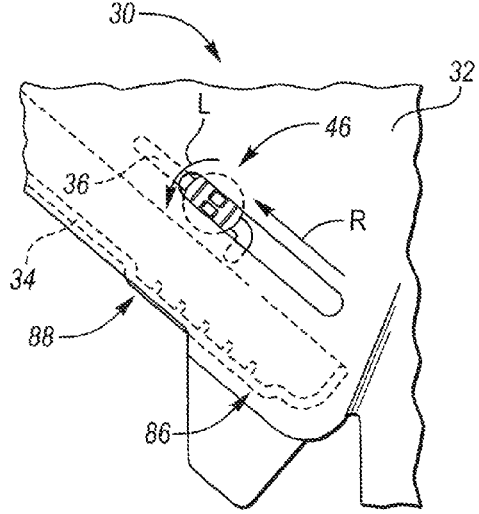
FIG. 7C is a fragmentary, schematic, side view illustration of the adjustable device positioner of FIG. 1 with the end rest unlocked at the second selected position.

The end rest 36 may be movable to the selected position 42 within the range of selectable positions 44 when the end rest 36 is placed in a movable position 46, as shown in FIGS. 7B-C. Referring again to FIGS. 4-6, the end rest 36 may be locked in the selected position 42 within the range of selectable positions 44 when the end rest 36 is placed in a locked position 48. The end rest 36 may be placed in one of the movable position 46 and the locked position 48 by rotating the end rest 36 about an axis of rotation (axis A). The end rest 36 may be placed in the movable position 46 from the locked position 48 by rotating the end rest 36 about the axis of rotation (axis A) in an unlocking rotational direction (arrow U). The end rest 36 may be placed in the locked position 48 from the movable position 46 by rotating the end rest 36 about the axis of rotation (axis A) in a locking rotational direction (arrow L). The end rest 36 may be placed in one of the movable position 46 and the locked position 48 by the operator or occupant of the vehicle 10. The end rest 36 may be placed in one of the movable position 46 and the locked position 48 without the use of a tool.

One of the bin 32 and the tray 34 may have a first guide feature 50. The first guide feature 50 may be a slot 52 formed in the bin 32, as shown. Alternatively, the first guide feature 50 may be a slot (not shown) formed in the tray 34. The slot 52 may have a width 54. The first guide feature 50 may be any other suitable guide feature. One of the bin 32 and the tray 34 may have a first lock feature 56. The first lock feature 56 may be the slot 52 formed in the bin 32, as shown. Alternatively, the first lock feature 56 may be the slot (not shown) formed in the tray 34. The first lock feature 56 may be any other suitable lock feature.

The end rest 36 may have a second guide feature 58 configured to cooperate with the first guide feature 50 to guide movement of the end rest 36 to the selected position 42 within the range of selectable positions 44 when the end rest 36 is placed in the movable position 46, as shown in FIGS. 7B-7C, and moved to the selected position 42. The end rest 36 may be movable to the selected position 42 by the operator or occupant of the vehicle 10. Referring again to FIGS. 4-6, the end rest 36 may have a second lock feature 64 configured to cooperate with the first lock feature 56 to lock the end rest 36 at the selected position 42 within the range of selectable positions 44 when the end rest 36 is placed in the locked position 48.

The second guide feature 58 may be a first rib 60 formed on the end rest 36 and having a length 62. The length 62 of the first rib 60 may be less than the width 54 of the slot 52 such that the first rib 60 is movable in the slot 52 when the end rest 36 is placed in the movable position 46, as shown in FIGS. 7B-7C. The second guide feature 58 may be any other suitable guide feature. Referring again to FIGS. 4-6, the second lock feature 64 may be a second rib 68 formed on the end rest 36 and having a length 70. The length 70 of the second rib 68 may be greater than or equal to the width 54 of the slot 52 such that the second rib 68 is locked via friction in the slot 52 when the end rest 36 is placed in the locked position 48. The second lock feature 64 may be any other suitable lock feature.

Continuing to refer to FIGS. 4-6, the tray 34 may have a third lock feature 72. The end rest 36 may have a fourth lock feature 76 configured to cooperate with the third lock feature 72 to lock the end rest 36 at the selected position 42 within the range of selectable positions 44 when the end rest 36 is placed in the locked position 48. The third lock feature 72 may be a third rib 74 formed in the tray 34, as shown. The fourth lock feature 76 may be an end 78 of the end rest 36, as shown. Additional guide features and lock features may be included in the adjustable device positioner 30 as appropriate.

Referring again to FIG. 3, the end rest 36 may form an opening 80 configured to accommodate a charging wire (not shown) for wired charging of the device 24 when the device 24 is stored in the adjustable device positioner 30. The adjustable device positioner 30 may include an inductive charge sender 82 attached to the bin 32 and in close proximity to the tray 34. The inductive charge sender 82 may be attached to the bin 32 via one or more fasteners 83, as shown. The device 24 may include an inductive charge receiver 84. The end rest 36 may be movable to and lockable in the selected position 42 within the range of selectable positions 44 to further accommodate inductive charging of the device 24 when the device 24 is stored in the adjustable device positioner 30.

Figure 7D:
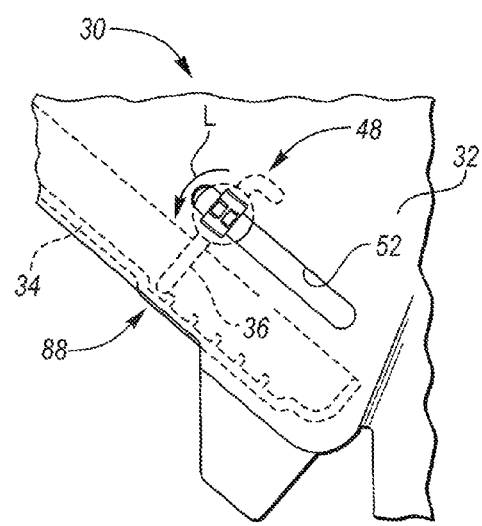
FIG. 7D is a fragmentary, schematic, side view illustration of the adjustable device positioner of FIG. 1 with the end rest locked in the second selected position.

Referring now to FIGS. 7A-7D, an example repositioning of the end rest 36 from a first selected position 86 to a second selected position 88 will be described. In FIG. 7A, the end rest 36 is shown in the first selected position 86 and in the locked position 48. In FIG. 7B, the end rest 36 has been rotated in the unlocking rotational direction (arrow U) to the movable position 46 and is ready to be moved to the second selected position 88 in a repositioning direction (arrow R). In FIG. 7C, the end rest 36 has been moved in the repositioning direction (arrow R) to the second selected position 88 and is ready to be rotated in the locking rotational direction (arrow L) to the locked position 48. In FIG. 7D, the end rest 36 is in the second selected position 88 and has been rotated in the locking rotational direction (arrow L) to the locked position 48. The repositioning direction (arrow R) may be in the direction shown, or may be in an opposite direction, as appropriate.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An adjustable device positioner configured for storage and access of a variety of devices, each having a back, a first end, a second end, and a length, the adjustable device positioner comprising:
   a bin;
   a tray disposed inside the bin, having a back rest surface, and positioned such that the back rest surface supports the backs of the devices when the devices are stored in the adjustable device positioner; and
   an end rest operatively connected to one of the bin and the tray and having an end rest surface configured to support the first ends of the devices when the devices are stored in the adjustable device positioner;
   wherein the end rest is movable to and lockable in a selected position to accommodate the lengths of the devices such that the second ends of the devices protrude from both the tray and the bin for easy hand access when the devices are stored in the adjustable device positioner.

2. The adjustable device positioner of claim 1, wherein the end rest is movable to the selected position when the end rest is placed in a movable position; and
   wherein the end rest is locked in the selected position when the end rest is placed in a locked position.

3. The adjustable device positioner of claim 2, wherein the end rest is placed in one of the movable position and the locked position by rotating the end rest.

4. The adjustable device positioner of claim 3, wherein one of the bin and the tray has a first guide feature;
   wherein one of the bin and the tray has a first lock feature;
   wherein the end rest has a second guide feature configured to cooperate with the first guide feature to guide movement of the end rest to the selected position when the end rest is placed in the movable position; and
   wherein the end rest has a second lock feature configured to cooperate with the first lock feature to lock the end rest at the selected position when the end rest is placed in the locked position.

5. The adjustable device positioner of claim 4, wherein the first guide feature is a slot formed in the tray and having a width;
   wherein the second guide feature is a first rib formed on the end rest and having a length; and
   wherein the length of the first rib is less than the width of the slot such that the first rib is movable in the slot when the end rest is placed in the movable position.

6. The adjustable device positioner of claim 5, wherein the first lock feature is the slot formed in the tray;
   wherein the second lock feature is a second rib formed on the end rest and having a length; and
   wherein the length of the second rib is greater than or equal to the width of the slot such that the second rib is locked in the slot when the end rest is placed in the locked position.

7. The adjustable device positioner of claim 6, wherein the tray further has a third lock feature;
   wherein the end rest further has a fourth lock feature configured to cooperate with the third lock feature to lock the end rest at the selected position when the end rest is placed in the locked position.

8. The adjustable device positioner of claim 7, wherein the third lock feature is a third rib formed in the tray; and
   wherein the fourth lock feature is an end of the end rest.

9. The adjustable device positioner of claim 1, wherein the end rest is movable to and lockable in the selected position without a tool.

10. The adjustable device positioner of claim 1, wherein the tray is removable from the bin without a tool.

11. The adjustable device positioner of claim 1, wherein the tray includes a rubber mat; and
   wherein the rubber mat forms the back rest surface of the tray.

12. The adjustable device positioner of claim 1, wherein the end rest forms an opening configured to accommodate a charging wire for wired charging of the selected one of the variety of devices when the devices are stored in the adjustable device positioner.

13. The adjustable device positioner of claim 1, further comprising an inductive charge sender attached to the bin;
   wherein the selected one of the variety of devices includes an inductive charge receiver; and
   wherein the end rest is movable to and lockable in the selected position to further accommodate inductive charging of the devices when the devices are stored in the adjustable device positioner.

14. A vehicle, comprising:
a storage unit, including:
an adjustable device positioner configured for storage and access of a variety of devices, each having a back, a first end, a second end, and a length, the adjustable device positioner having:
a bin;
a tray disposed inside the bin, having a back rest surface, and positioned such that the back rest surface supports the backs of the devices when the devices are stored in the adjustable device positioner; and
an end rest operatively connected to one of the bin and the tray and having an end rest surface configured to support the first ends of the devices when the devices are stored in the adjustable device positioner;
wherein the end rest is movable to and lockable in a selected position to accommodate the lengths of the devices such that the second ends of the devices protrude from both the tray and the bin for easy hand access when the devices are stored in the adjustable device positioner.

15. The vehicle of claim 14, wherein the storage unit is a center console having an openable cover for access to the bin;
wherein the center console is configured with an opening for the adjustable device positioner; and
wherein the devices protrude from the center console through the opening for easy hand access when the devices are stored in the adjustable device positioner.

16. The vehicle of claim 15, wherein the end rest of the adjustable device positioner is movable to and lockable in the selected position by an occupant of the vehicle when the openable cover is in an open position.

17. The vehicle of claim 16, wherein the end rest is movable to the selected position when the end rest is placed in a movable position by the occupant of the vehicle; and
wherein the end rest is locked in the selected position when the end rest is placed in a locked position by the occupant of the vehicle.

18. The vehicle of claim 17, wherein the end rest is placed in one of the movable position and the locked position by rotating the end rest.

19. The vehicle of claim 14, wherein the end rest is movable to and lockable in the selected position without a tool.

20. The vehicle of claim 14, further comprising an inductive charge sender attached to the bin and in close proximity to the tray;
wherein the devices include an inductive charge receiver; and
wherein the end rest is movable to and lockable in the selected position to further accommodate inductive charging of the devices when the devices are stored in the adjustable device positioner.

* * * * *